United States Patent [19]

Windross

[11] Patent Number: 5,165,774

[45] Date of Patent: Nov. 24, 1992

[54] FIBEROPTIC WIDE-ANGLE ILLUMINATING DEVICE

[75] Inventor: Gene R. Windross, Westland, Mich.

[73] Assignee: Ford Motor Company, Dearborn, Mich.

[21] Appl. No.: 811,258

[22] Filed: Dec. 20, 1991

[51] Int. Cl.⁵ .................................................. F21V 7/04
[52] U.S. Cl. ...................................... 362/32; 362/61; 362/80; 385/35; 359/744
[58] Field of Search ........................ 362/32, 80, 31, 61, 362/806, 457, 458; 126/440; 359/744; 385/35, 33

[56] References Cited

U.S. PATENT DOCUMENTS

| | | | |
|---|---|---|---|
| 3,771,516 | 11/1973 | Corriero | 362/32 X |
| 4,589,400 | 5/1986 | Mori | 26/440 |
| 4,693,556 | 9/1987 | McCaughan, Jr. | 362/32 X |
| 4,811,172 | 3/1989 | Davenport et al. | 362/61 |
| 4,868,718 | 9/1989 | Davenport et al. | 362/32 |
| 4,949,227 | 8/1990 | Finch et al. | 362/61 |
| 4,958,263 | 9/1990 | Davenport et al. | 362/32 |

OTHER PUBLICATIONS

"60e Salon International de l'Automobile, Neutral Territory, Mixing Business and Pleasure at the Geneva Auto Show," *Road & Track* 1990, pp. 62-64.

"High Intensity Headlights: Safety Meets Style in the Mini-Arc Lamps," *Popular Science,* May 1990 vol. 236, No. 5 pp. 90-93.

"Trends," Motor Trend, Jun. 1990, pp. 24-25.

"Level 1-32 Stories"-Computer print-out of Nexis search.

*Primary Examiner*—Larry Jones
*Attorney, Agent, or Firm*—Clifford L. Sadler; Damian Porcari

[57] ABSTRACT

A fiberoptic wide-angle illuminating device includes a fiberoptic cable providing a bundle of optical fibers for conducting light, a yoke having a C-shaped head receiving and supporting output ends of the optical fibers arranged in a splayed-out fashion in a row and defining a single elongated aperture aligned with the output ends of the optical fibers for receiving and passing light emitted from the optical fibers, and a single wide-angle optical lens which is preferably spherical or cylindrical aligned in a predetermined relationship with the single aperture for receiving light emitted from the optical fibers through the aperture and for projecting the light in a desired beam pattern. The single aperture has a configuration of an arc such that the lens projects the light in an arcuate beam pattern.

20 Claims, 2 Drawing Sheets

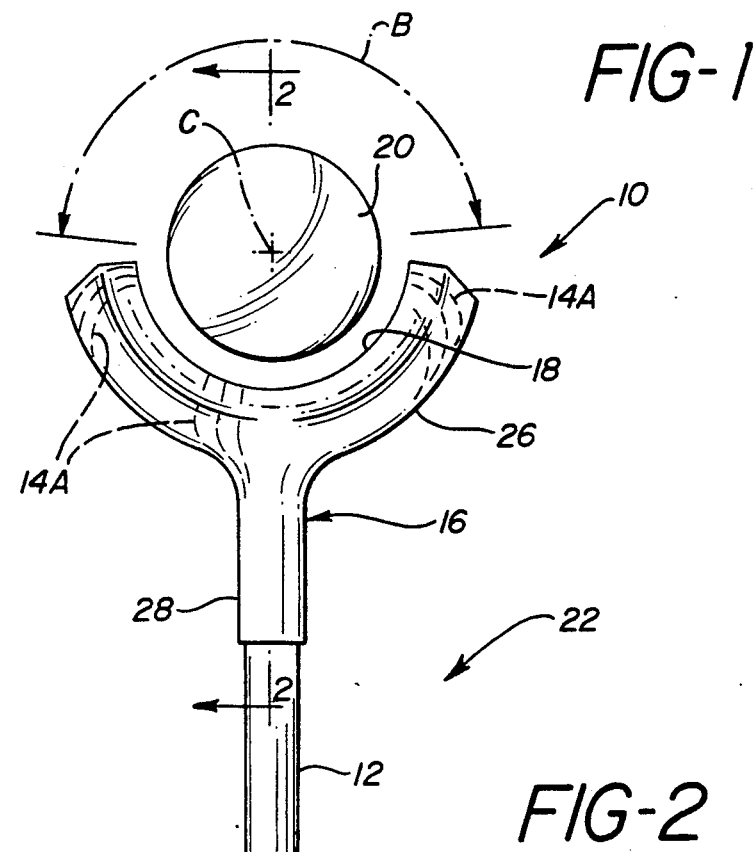
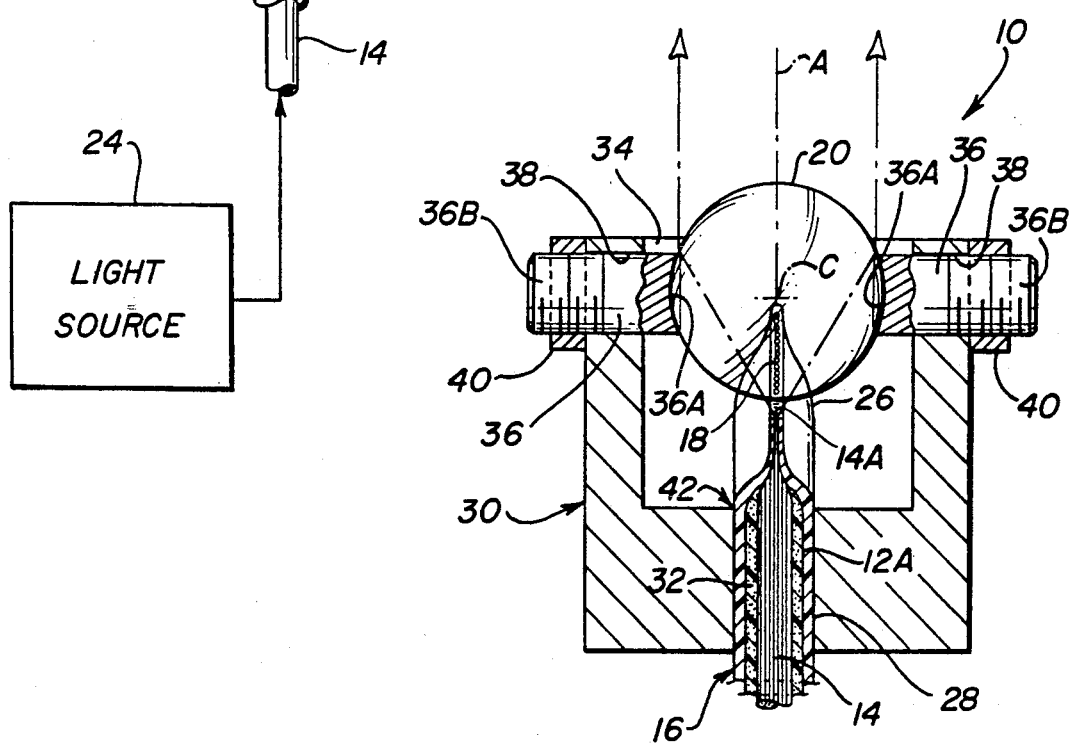

FIBEROPTIC WIDE-ANGLE ILLUMINATING DEVICE

CROSS-REFERENCE TO RELATED APPLICATION

Reference is hereby made to a copending patent application, by the same applicant and assigned to the same assignee, disclosing related subject matter entitled "Fiber-Optic Multi-beam Roadway Illuminating Device", U.S. Ser. No. 811,253, filed Dec. 20, 1991.

BACKGROUND OF THE INVENTION

The present invention relates generally to fiberoptic lighting systems and, more particularly, to a fiberoptic wide-angle illuminating device.

It is well known in the field of fiberoptics that optical fibers are capable of effectively and efficiently conducting light from a common source along nonlinear paths to various locations remote from the light source without encountering substantial transmission losses. Because of this capability, there is increasing interest in the application of optical fibers to uses where space is restricted. One such use is the overall illumination needs of vehicles where space is scarce due to aerodynamic and styling considerations.

The application of optical fibers to vehicular illumination needs is proposed in U.S. Pat. No. 4,811,172 to Davenport et al., U.S. Pat. No. 4,868,718 to Davenport et al., U.S. Pat. No. 4,949,227 to Finch et al., and U.S. Pat. No. 4,958,263 to Davenport et al., all assigned to General Electric Company. Different approaches to providing forward illumination patterns for vehicles are disclosed in U.S. Pat. Nos. 4,811,172, 4,868,718 and 4,949,227. U.S. Pat. No. 4,811,172 also discloses an approach to providing rear or taillight illumination for vehicles. An approach to providing a centralized lighting system for aerodynamically styled vehicles which employs a high intensity light source is disclosed in U.S. Pat. No. 4,958,263.

These different approaches to providing forward and rear illumination patterns may fulfill illumination needs of vehicles. However, major shortcomings of these approaches are the excessive size of the illumination device and multiplicity and complexity of parts used by the device. In view of these shortcomings, the devices of the aforementioned patents fail to accommodate space limitations dictated by vehicular aerodynamic and styling requirements. Thus, there is still a need for a fiberoptic illumination device that will satisfy illumination requirements while avoiding these shortcomings.

SUMMARY OF THE INVENTION

This need is met by the fiberoptic wide-angle illuminating device of the present invention. The approach of the present invention is to employ a fiberoptic cable containing bundles of optical fibers (each bundle containing a large number of individual filaments) whose output ends are arranged in splayed-out fashion, with a yoke receiving and supporting the optical fibers and defining an arcuate-shaped aperture aligned with and lying in the plane of the splayed optical fibers for receiving and passing light emitted from the optical fibers, and a single wide-angle optical lens which is preferably spherical or cylindrical aligned with the single aperture of the yoke for receiving light emitted from the optical fibers through the aperture and for projecting the light in a desired wide-angle arcuate beam pattern. Thus, it is readily apparent that the approach adopted by the present invention will result in an illuminating device that is substantially smaller in size and reduced in complexity compared to the devices of the previously-cited U.S. patents.

It is thus a feature of the present invention to provide a fiberoptic wide-angle illuminating device using a single spherical or cylindrical optical lens and a single elongated aperture in conjunction with a plurality of optical fibers; to provide the illuminating device where output ends of the plurality of optical fibers are arranged in splayed out fashion in a row; to provide the illuminating device where the single aperture is aligned with the splayed output ends of all optical fibers; and to provide the illuminating device having a yoke with a C-shaped head defining the single aperture in the configuration of an arc such that the light is projected by the lens in an wide-angle arcuate beam pattern.

An advantage of the present fiberoptic wide-angle illuminating device, in addition to its space saving features, is its ease of assembly and alignment. A single lens is relatively easy to assemble and align. And yet with the miniaturized, single lens illuminating device of the present invention a wide angle of light can be projected.

Other features and advantages of the invention will become apparent from the following description, the accompanying drawings and the appended claims.

BRIEF DESCRIPTION OF THE DRAWINGS

FIG. 1 is a plan view of a fiberoptic wide-angle illuminating device having a construction in accordance with the present invention;

FIG. 2 is a fragmentary side elevational, partly sectioned, view of the illuminating device taken along line 2—2 of FIG. 1, showing also a support housing of the device;

DETAILED DESCRIPTION OF THE PREFERRED EMBODIMENT

Figure 4:
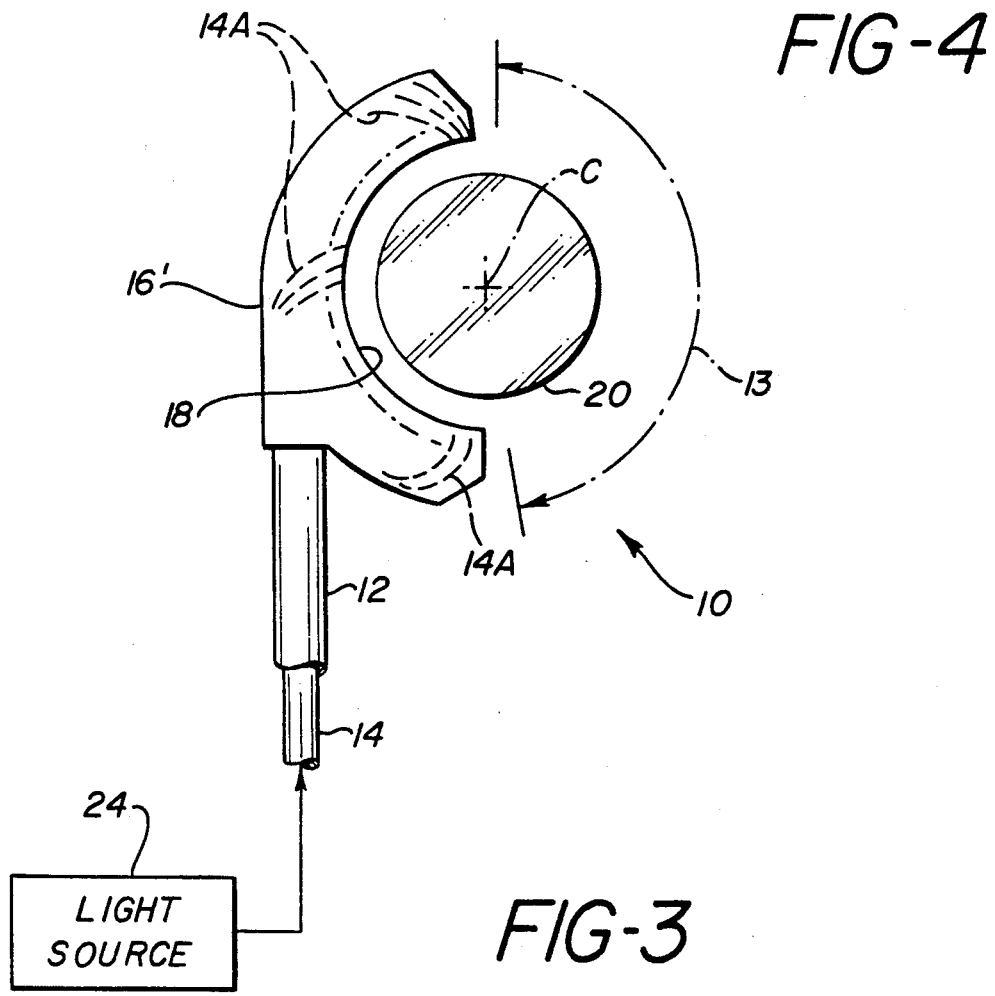
FIG. 4 is a plan view of another embodiment of the fiberoptic wide-angle illuminating device of the present invention.

Referring to FIG. 1 of the drawings, there is illustrated a preferred embodiment of a fiberoptic wide-angle illuminating device, generally designated 10, having a construction in accordance with the present invention. While the illuminating device 10 of the present invention is generally applicable to a variety of lighting applications, it is particularly suited for use as a taillight, turn signal, fog or backup light for vehicular illumination purposes.

Referring to FIGS. 1 and 2, the fiberoptic spherical illuminating device 10 basically includes a fiberoptic cable 12 containing bundles of optical fibers 14 for conducting and emitting output light, a yoke 16 defining a single elongated aperture 18 in the configuration of a semi-circular arc aligned with output ends 14A of the optical fibers 14, and a single spherical optical lens 20 aligned with the single arcuate aperture 18. The arcuate aperture 18 receives and passes light emitted from the optical fibers 14 to the spherical lens 20. The spherical lens 20 receives the light and projects the light in a desired arcuate-shaped beam pattern "B". The arcuate-shaped aperture 18 provides wide-angle illumination.

As shown in FIG. 1, the angle of arcuate-shaped aperture may be about 170° and thus the spherical lens 20 will project the light in the arcuate beam pattern "B" of approximately 170°. Actually, the angle of beam pattern "B" may be or may be caused to be greater than 170° or even 180°. A dispersion of light greater than 180° is possible because yoke 16 may be made extremely thin, i.e. on the order of 0.04 inches thick. When using such a thin yoke, the beam splitting from one side of the yoke causes light to pass over and under the other side of the yoke. Some light will be blocked by the yoke, but because it is very thin, the overall beam pattern is maintained and, in that instance, it may be greater than 170° or even 180°. Of course, the extent of the beam pattern is also controlled by the shape and extent of housing 30 as will be explained in more detail below.

The illuminating device 10 is part of a lighting system, indicated by the numeral 22, which has a light source 24 coupled in a well-known conventional way to input ends of the optical fibers 14 of the fiberoptic cable 12. Any suitable light source 24 can be utilized, such as the one described in my copending application Ser. No. 656,919 filed Feb. 19, 1991, which disclosure is incorporated herein by reference.

More particularly, yoke 16 has a generally Y-shaped configuration composed of a generally C-shaped head portion 26 and a linear neck portion 28 integrally attached to and extending from the bight of the C-shaped head portion 26. The neck portion 28 is axially aligned with the center "C" of the spherical lens 20 and a longitudinal axis "A" of the lens 20 extending through its center "C". The neck portion 28 receives and supports an end portion 12A of the fiberoptic cable 12. The C-shaped head portion 26 of the yoke 16 receives and supports the output ends 14A of the optical fibers 14 arranged in a splayed-out fashion in a row. Thus, as mentioned, optical fibers 14 are bundles of a large number of individual filaments on the order of 0.002 inches in diameter. Optical fibers 14 are spaced within a block 32 inside yoke 16 and at the output ends 14A are further splayed into a stack of 5-10 layers of filaments 0.02 to 0.04 inches thick. Such a splay will result in a fiberoptic ribbon the width of aperture 18. Block 32 may be an acrylic or epoxy material which will encapsulate optical fibers 14. A C-shaped opening the size of aperture 18 is cut and polished into block 32, exposing the output ends 14A of optical fibers 14. The output ends 14A are wetted with a wetting agent such as isopropyl alcohol and yoke 16 with aperture 18 formed therein is overlayed. The arcuate aperture 18 is defined on a concave side of the C-shaped head portion 26 of the yoke 16 and is aligned with and lies in the plane of the splayed optical fibers 14 for receiving and passing light emitted from the optical fibers.

The illuminating device 10 also includes a housing 30 and means for clamping the spherical lens 20 in the desired predetermined aligned relationship with the aperture 18 of the yoke 16. The neck portion 28 of the yoke 16 is mounted through a hole 42 in the rear side of the housing 30, whereas the spherical lens 20 protrudes through a large opening 34 in the front side of the housing 30. The size of opening 34, the location of the clamping means, the shape of housing 30, and the extent to which spherical lens 20 protrudes through opening 34, as well as the size of C-shaped head portion 26 of yoke 16, determine the angle of light emission from spherical lens 20, which may be adjusted by varying one or more of these parameters.

The clamping means includes a pair of threaded stems 36 mounted through opposite and axially aligned threaded holes 38 in the housing 30. The threaded stems 36 have concave-shaped inner ends 36A adapted to clamp against opposite top and bottom portions of the spherical lens 20 to retain the lens in alignment with the aperture 18. By turning threaded stems 36, the stems can be movably adjusted toward and away from the lens 20 for precisely locating it in aligned relationship with the aperture 18. Then, by using lock nuts 40, the threaded stems 36 can be locked at their adjusted portions.

As noted in FIGS. 1-2, aperture 18 is spaced a slight distance from spherical lens 20. Such a spacing is necessary to permit alignment of spherical lens 20 with aperture 18 using threaded stems 36. Alternatively, aperture 18 may be in direct contact with lens 20 and C-shaped head portion 26 of yoke 16 bonded in fixed relationship to lens 20. In that instance, adjustment may still be made possible by use of an enlarged hole 42 in housing 30 so that yoke 16 may move upon or down, back and forth with the movement of lens 20 as it is aligned.

Figure 3:
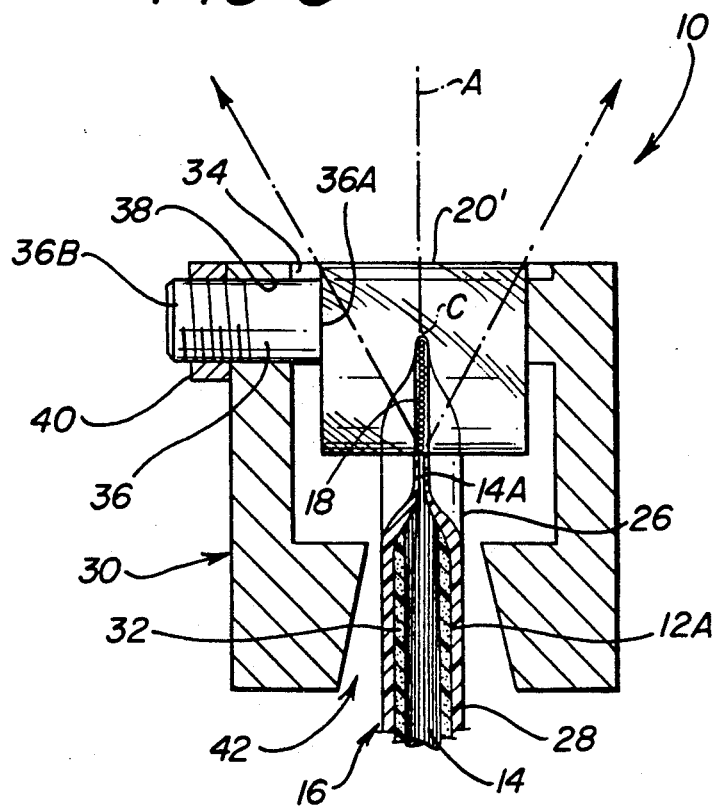
FIG. 3 is a fragmentary side elevational, partly in section showing various alternative features of the fiber-optic wide-angle illuminating device.

Such an arrangement is shown in FIG. 3, which also shows other alternatives which may be used individually or in various combinations. Thus, in FIG. 3 there is shown a vertical cylindrical lens 20' which may be used in place of a spherical lens 20. The C-shaped head portions 26 of yoke 16 is bonded to vertical cylindrical lens 20'. Installation and alignment is accomplished by threading fiberoptic cable 12 having yoke 16 and vertical cylindrical lens 20' attached thereto into housing 30, through enlarged hole 42 and, then, using a single threaded stem 36 (which may be a set screw in this instance) to lock vertical cylindrical lens 20' in place. Hole 42 may thereafter by filled with a packing material (not shown) if desired.

In FIG. 4 yet another embodiment is shown having a yoke 16' of modified shape from that shown in FIG. 1. The housing would be adapted accordingly by relocating hole 42 within the housing to accommodate threading of fiberoptic cable 12 therethrough. As will be apparent, other modified shapes may be used for the yoke or housing.

Having thus described the fiberoptic spherical illuminating device of the present invention in detail and by reference to a preferred embodiment thereof, it will be apparent that modifications and variations are possible without departing from the scope of the invention defined in the appended claims.

What is claimed is:

1. A fiberoptic wide-angle illuminating device, comprising:
   means providing a plurality of optical fibers for conducting light, said optical fibers having output ends for emitting light;
   means defining a single elongated aperture aligned with said output ends of all of said optical fibers for receiving light emitted from said optical fibers and for passing light; and
   a single wide-angle optical lens aligned in a predetermined relationship with said single aperture for receiving light emitted from said optical fibers and passed through said aperture and projecting the light in a desired beam pattern.

2. The device of claim 1 wherein said single aperture has a configuration of a semi-circular arc.

3. The device of claim 2 wherein said lens projects the light in an arcuate beam pattern of at least about 170°.

4. A fiberoptic wide-angle illuminating device, comprising:
   means providing a plurality of optical fibers for conducting light, said optical fibers having output ends for emitting light;
   a yoke having a C-shaped head portion receiving and supporting said output ends of said optical fibers arranged in a splayed-out fashion in a row and defining a single elongated aperture having a configuration of a semi-circular arc aligned with said output ends of all of said optical fibers for receiving light emitted from said optical fibers and for passing light; and
   a single wide-angle optical lens aligned in a predetermined relationship with said single aperture for receiving light emitted from said optical fibers and passed through said aperture and projecting the light in a desired beam pattern.

5. The device of claim 4 wherein a block encapsulating said output ends of said optical fibers is located within said yoke.

6. The device of claim 5 wherein said single aperture is aligned with said splayed output ends of all optical fibers.

7. The device of claim 4 further comprising:
   a housing, said yoke being located in said housing; and
   means mounted to said housing for clamping said lens in said predetermined aligned position.

8. The device of claim 7 wherein said lens is spherical or cylindrical.

9. The device of claim 8 further including means for adjusting the alignment of said lens.

10. A lighting system, comprising:
    a source of light;
    means providing a plurality of optical fibers for conducting light, said optical fibers having output ends for emitting light;
    means defining a single elongated aperture aligned with said output ends of all of said optical fibers for receiving light emitted from said optical fibers and for passing light; and
    a single wide-angle optical lens aligned in a predetermined relationship with said single aperture for receiving light emitted from said optical fibers and passed through said aperture and projecting the light in a desired beam pattern.

11. The system of claim 10 wherein said single aperture has a configuration of an arc.

12. The system of claim 11 wherein said lens projects the light in an arcuate beam pattern of at least about 170°.

13. The system of claim 12 wherein said lens is spherical or cylindrical.

14. The system of claim 13 wherein said yoke is bonded said lens.

15. The system of claim 14 further comprising a housing, said yoke being located in said housing; and means mounted to said housing for clamping said lens in a predetermined aligned position.

16. The system of claim 15 further including means for adjusting the alignment of said lens.

17. A lighting system, comprising:
    a source of light;
    means providing a plurality of optical fibers for conducting light, said optical fibers having output ends for emitting light;
    a hollow yoke having a C-shaped head portion receiving and supporting said output ends of said optical fibers arranged in a splayed-out fashion in a row and defining a single elongated aperture having a configuration of a semi-circular arc aligned with said output ends of all of said optical fibers for receiving light emitted from said optical fibers and for passing light; and
    a single wide-angle optical lens aligned in a predetermined relationship with said single aperture for receiving light emitted from said optical fibers and passed through said aperture and projecting the light in a desired beam pattern.

18. The system of claim 17 wherein a block encapsulating said output ends of said optical fibers is located within said yoke.

19. The system of claim 18 wherein said single aperture is aligned with said splayed output ends of all optical fibers.

20. The system of claim 17 further comprising:
    a housing, said yoke mounted to said housing; and
    means mounted to said housing for clamping said lens in said predetermined aligned position.

* * * * *